J. WILKINSON.
Machines for Sowing Seeds or Fertilizers.
No. 151,674. Patented June 2, 1874.
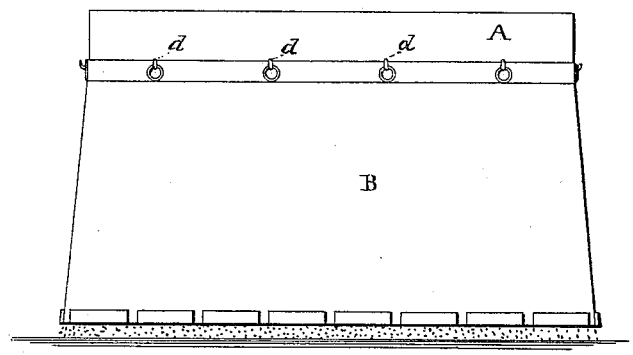
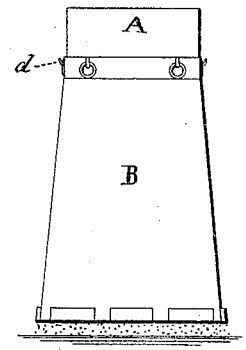
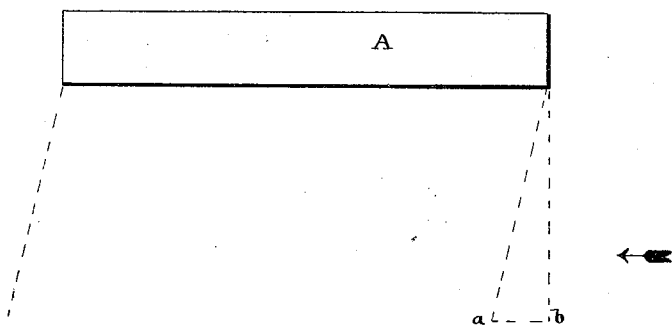
WITNESSES
Carroll Webster
H. A. Daniels
INVENTOR
John Wilkinson
by G.H.W.T. Howard
attys.

UNITED STATES PATENT OFFICE.

JOHN WILKINSON, OF BALTIMORE, MARYLAND.

IMPROVEMENT IN MACHINES FOR SOWING SEEDS OR FERTILIZERS.

Specification forming part of Letters Patent No. 151,674, dated June 2, 1874; application filed April 18, 1874.

*To all whom it may concern:*

Be it known that I, JOHN WILKINSON, of Baltimore, in the State of Maryland, have invented certain new and useful Improvements in Seed-Sowers and Distributers for Fertilizers, of which the following is a specification, reference being had to the accompanying drawing forming a part of the specification herein.

Figure 1 represents an ordinary seed-box, and the seed blown at an angle by the wind. Fig. 2 represents a seed-box with my invention attached thereto, and Fig. 3 represents an end view of same.

The object of my invention is to provide an attachment to seed-boxes, or other receptacles containing the seed or substance to be distributed or dropped to the earth, designed to prevent the action of the wind upon the seed or substance, which frequently operates so as to distribute the same unevenly, or, by blowing it aside, to leave a portion of the ground or track traversed by the machine unprovided with the seed or fertilizer.

This inconvenience and great defect is obviated by applying to the box A, containing the seed or substance to be distributed, a flexible wind-screen, B, surrounding the said box, and reaching downward to within a convenient distance from the earth. The wind-screen B is weighted at or near its lower end, to enable it to keep a decided shape, but in such a manner as will not interfere with its flexibility, which it is important it should possess to admit of it avoiding stones, stumps, or other obstructions lying in its track.

The seed or other substance, being protected by the wind-screen, is allowed to fall directly to the earth, without being blown at an angle, as shown in the drawing, where the space indicated by *a b* receives no seed when it is thus blown aside by the wind coming from the direction indicated by the arrow.

The screen B may be made of muslin or other flexible material, and suspended from the seed-box or other receptacle by means of hooks *d*, which pass through holes in the screen, strengthened by rings or other means of attachment.

Having described my invention, I claim and desire to secure by Letters Patent—

The wind-screen suspended from the seed-box or other receptacle, as specified, provided with weights at or near the lower extremity, as set forth.

In witness whereof I have hereunto subscribed my name in the presence of two witnesses this 10th day of April, 1874.

JOHN WILKINSON.

Witnesses:
 W. S. WILKINSON,
 GEORGE H. HOWARD.